(12) United States Patent
Geng et al.

(10) Patent No.: US 12,301,481 B2
(45) Date of Patent: May 13, 2025

(54) SMOOTH ORTHOGONAL FREQUENCY DIVISION MULTIPLEXING SYMBOLS GENERATION WITH VARYING GAINS

(71) Applicant: GREATER SHINE LIMITED, New Taipei (TW)

(72) Inventors: Jifeng Geng, San Diego, CA (US); Hong Kui Yang, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 533 days.

(21) Appl. No.: 17/882,004

(22) Filed: Aug. 5, 2022

(65) Prior Publication Data

US 2022/0376850 A1 Nov. 24, 2022

Related U.S. Application Data

(63) Continuation of application No. PCT/IB2020/060190, filed on Oct. 30, 2020.

(60) Provisional application No. 62/970,331, filed on Feb. 5, 2020.

(51) Int. Cl.
*H04L 5/00* (2006.01)
*H04L 27/26* (2006.01)

(52) U.S. Cl.
CPC .......... *H04L 5/0007* (2013.01); *H04L 5/0096* (2013.01); *H04L 27/2607* (2013.01); *H04L 27/2613* (2013.01)

(58) Field of Classification Search
CPC ................. H04L 5/0007; H04L 5/0096; H04L 27/2613; H04L 27/2607; H04L 27/2602
See application file for complete search history.

(56) References Cited

U.S. PATENT DOCUMENTS

| 10,411,770 B2 | 9/2019 | Kuchi |
| 2005/0068886 A1 | 3/2005 | Wang |
| 2007/0005830 A1 | 1/2007 | Yancey |
| 2007/0058739 A1 | 3/2007 | Aytur |

(Continued)

FOREIGN PATENT DOCUMENTS

| CN | 1449144 A | 10/2003 |
| CN | 1514558 A | 7/2004 |

(Continued)

OTHER PUBLICATIONS

LI Jin-hai et al."Application of windowing in weaking the sensitivity of OFDM systems to frequency offset" «Journal of Shandong University» ,vol. 38, No. 5, Dec. 2003, the whole document, 15 pages with English X translation.

(Continued)

*Primary Examiner* — Sulaiman Nooristany
(74) *Attorney, Agent, or Firm* — BAYES PLLC

(57) ABSTRACT

Embodiments of apparatus and method for implementing weighted overlap-and-add (WOLA) after digital gain adjustment are disclosed. In an example, an apparatus for wireless communication includes a baseband chip and a radio frequency (RF) chip including a digital front-end. The baseband chip is configured to generate a stream of orthogonal frequency-division multiplexing (OFDM) symbols and adjust gains of the stream of OFDM symbols. The baseband chip or the RF chip is configured to apply WOLA to the stream of OFDM symbols having the adjusted gains.

18 Claims, 12 Drawing Sheets

(56) References Cited

U.S. PATENT DOCUMENTS

| | | |
|---|---|---|
| 2007/0253319 A1 | 11/2007 | Jansen |
| 2008/0002645 A1 | 1/2008 | Seki |
| 2008/0130799 A1 | 6/2008 | Yousef |
| 2009/0245409 A1 | 10/2009 | Kandukuri Narayan |
| 2009/0310690 A1 | 12/2009 | Lee |
| 2010/0303130 A1 | 12/2010 | Moh |
| 2012/0147795 A1 | 6/2012 | Narayan |
| 2015/0349987 A1 | 12/2015 | Soriaga |
| 2015/0372843 A1 | 12/2015 | Bala |
| 2015/0381468 A1 | 12/2015 | Murphy |
| 2017/0149595 A1 | 5/2017 | Rakib |
| 2017/0331647 A1 | 11/2017 | Abdelghaffar |
| 2017/0331663 A1 | 11/2017 | Moradi |
| 2017/0347340 A1 | 11/2017 | Haley et al. |
| 2018/0123846 A1 | 5/2018 | Kibutu |
| 2018/0145783 A1 | 5/2018 | Park et al. |
| 2018/0278397 A1 | 9/2018 | Park |
| 2018/0367355 A1 | 12/2018 | Pan et al. |
| 2019/0081728 A1 | 3/2019 | Dong |
| 2019/0190666 A1 | 6/2019 | Montreuil |
| 2020/0007361 A1* | 1/2020 | Renfors .............. H04L 27/2626 |
| 2020/0213168 A1 | 7/2020 | Bala |
| 2022/0368434 A1 | 11/2022 | Geng |
| 2022/0376850 A1 | 11/2022 | Geng |

FOREIGN PATENT DOCUMENTS

| | | |
|---|---|---|
| CN | 101588327 A | 11/2009 |
| CN | 101901602 A | 12/2010 |
| CN | 101923862 A | 12/2010 |
| CN | 102256200 A | 11/2011 |
| CN | 102362461 A | 2/2012 |
| CN | 102480626 A | 5/2012 |
| CN | 103095628 A | 5/2013 |
| CN | 104703272 A | 6/2015 |
| CN | 107580764 A | 1/2018 |
| CN | 108141294 A | 6/2018 |
| CN | 207518588 U | 6/2018 |
| CN | 108353052 A | 7/2018 |
| CN | 109075884 A | 12/2018 |
| CN | 109155771 A | 1/2019 |
| CN | 109964464 A | 7/2019 |
| EP | 1873989 A1 | 1/2008 |
| EP | 3457617 A1 | 3/2019 |
| KR | 20180100837 A | 9/2018 |
| WO | 2009120912 A1 | 10/2009 |
| WO | 2014123926 A1 | 8/2014 |
| WO | 2018100591 A1 | 6/2018 |

OTHER PUBLICATIONS

Jia Zheng-Lei et al. "BGLL Community Detection for Weighted Complex Network Based on Node Similarity" «Computer Systems & Applications», vol. 28, Issue 2, 2019, the whole document, 18 pages with English translation.

Notice of Allowance of the Chinese application No. 202080095785. 9, issued on Aug. 7, 2023, 15 pages with English translation.

Notice of Allowance of the Chinese application No. 202080094486. 3, issued on Aug. 18, 2023, 9 pages with English translation.

Zhang Shi-zhu et al, "An implementation of windowing based on OFDM signals", «Information technology» Issue 6, 2009, http://43.138.60.40/kns8/defaultresult/index.12 pages with English translation.

Ronald Nissel et al., "Filter Bank Multicarrier Modulation Schemes for Future Mobile Communications", IEEE Journal on Selected Areasin Communications, Mar. 31, 2017. https://sci-hub.se/10.1109/JSAC.2017.2710022. 14 pages.

First Office Action of the Chinese application No. 202080095785.9, issued on Mar. 25, 2023. 25 pages with English translation.

Zayani et al., titled "WOLA-OFDML a potential candidate for asynchronous 5G"; Feb. 9, 2017 (Feb. 9, 2017). 978-1-5090-2482-7/16/$31.00 © 2016 IEEE. 5 pages.

International Search Report in the international application No. PCT/IB2020/056673, mailed on Nov. 18, 2020. 3 pages.

Written Opinion of the International Search Authority in the international application No. PCT/IB2020/056673, mailed on Nov. 18, 2020. 12 pages.

"RAN4#83 Meeting report", 3GPP TSG-RAN WG4 Meeting #84, R4-1707001, Berlin, Germany, Aug. 21-25, 2017. 596 pages.

Zhao Zi-xu et al., "Optimal Design of Cyclic Prefix Length Based on QPSK-OFDM System", Fire Control & Command Control, vol. 43, No. May 5, 2018.http://43.138.60.40/kns8/defaultresult/index. 12 pages with English translation.

Wang Xianhai et al., "Design of digital backend based on IWOLA for pulsar de-dispersion", Journal of Southeast University(Namral Science Edition), vol. 45 No. Mar. 2, 2015, http://43.138.60.40/kns8/defaultresult/index. 14 pages with English translation.

Wang Zhenduo,"Application and Performance Research of Carrier Scheme Fusion Mechanism Based on WFRFT", China Doctoral Dissertation Full Text Database (Information Science and Technology Series), No. 01.http://43.138.60.40/kns8/defaultresult/index. 153 pages with English translation.

Seong BeomHong,"PerformanceEnhancement of Faster-Than-Nyquist Signaling Based Single-Carrier Frequency-Domain Equalization Systems" « IEEE Transactions on Broadcasting » , DOI: 10.1109/TBC.2016.2593400, Date of Publication: Nov. 9, 2016. https:// sci-hub.se/10.1109/TBC.2016.2593400. 18 pages.

First Office Action of the Chinese application No. 202080094486.3, issued on Apr. 12, 2023. 25 pages with English translation.

Hammoodi Ahmed et al: "Green Coexistence for 5G Waveform Candidates: A Review",IEEE Access, vol. 7, pp. 10103-10126, XP011707117,DOI:10.1109/ACCESS.2019.2891312[retrieved on Jan. 28, 2019]. 24 pages.

QUALCOMM Incorporated: "Waveform Candidates",3GPP Draft; R1-162199_WAVEFORM _CANDIDATES, 3rd Generation Partnership Project (3GPP), Mobile Competence Centre; 650, Route Deslucioles; F-06921 Sophia-Antipolis Cedex; Francevol. RAN WG1, No., Busan, Korea; Apr. 11, 2016 Apr15, 2016Apr. 2, 2016 (Apr. 2, 2016), XP051080027, Retrieved from the Internet: URL:http://www.3gpp.org/ftp/tsg_ran/WG1_RI 1/TSGR1_84b/Docs/ [retrieved on Apr. 2, 2016]. 26 pages.

Supplementary European Search Report in the European application No. 20919457.0, mailed on Jun. 14, 2023. 10 pages.

Non-Final Office Action of the U.S. Appl. No. 17/890,193, issued on Jun. 7, 2023.

International Search Report in the international application No. PCT/IB2020/060190, mailed on Apr. 1, 2021,2 pages.

Written Opinion of the International Search Authority in the international application No. PCT/IB2020/060190, mailed on Apr. 1, 2021, 16 pages.

* cited by examiner

SMOOTH ORTHOGONAL FREQUENCY DIVISION MULTIPLEXING SYMBOLS GENERATION WITH VARYING GAINS

CROSS-REFERENCE TO RELATED APPLICATIONS

This application is a continuation of International Application No. PCT/IB2020/060190 filed on Oct. 30, 2020, which claims the benefit of priority to U.S. Provisional Application No. 62/970,331 filed on Feb. 5, 2020, both of which are hereby incorporated by reference in their entireties.

BACKGROUND

Wireless communication systems are widely deployed to provide various telecommunication services such as telephony, video, data, messaging, and broadcasts. Orthogonal frequency division multiplexing (OFDM) is one of the most widely used and adopted digital multi-carrier modulation methods and has been used extensively for cellular communications, such as 4th-generation (4G) Long Term Evolution (LTE) and 5th-generation (5G) New Radio (NR). One version of OFDM, for example, used in 4G LTE, is cyclic prefix OFDM (CF-OFDM), which has a waveform format that is designed to overcome the inter-symbol interference (ISI) resulting from delays and reflections.

SUMMARY

Embodiments of the present disclosure relate to apparatus and method for wireless communication.

Embodiments of apparatus and method for generating smooth OFDM signal with varying gain are disclosed herein.

In one example, an apparatus for wireless communication includes a baseband chip and a radio frequency (RF) chip including a digital front-end. The baseband chip includes an orthogonal frequency-division multiplexing (OFDM) module configured to generate a stream of OFDM symbols and a gain control module configured to adjust gains of the stream of OFDM symbols. The baseband chip or the RF chip includes a weighted overlap-and-add (WOLA) module configured to apply WOLA to the stream of OFDM symbols having the adjusted gains.

In another example, an apparatus for wireless communication includes a baseband chip and a RF chip including a digital front-end. The baseband chip includes an OFDM module configured to generate a stream of OFDM symbols and a digital interface configured to transmit the stream of OFDM symbols, gain control information indicative of target gain levels of the stream of OFDM symbols, and symbol boundary information indicative of boundaries of the stream of OFDM symbols. The RF chip includes a digital interface configured to receive, from the baseband chip, the stream of OFDM symbols, the gain control information, and the symbol boundary information, a gain control module configured to adjust gains of the stream of OFDM symbols based on the gain control information, and a WOLA module configured to apply WOLA to the stream of OFDM symbols having the adjusted gains in a streamlined manner based on the symbol boundary information.

In yet another example, a method for wireless communication is disclosed. A stream of OFDM symbols is generated. Gains of the stream of OFDM symbols are adjusted. After adjusting the gains of the stream of OFDM symbols, WOLA is applied to the stream of OFDM symbols having the adjusted gains.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
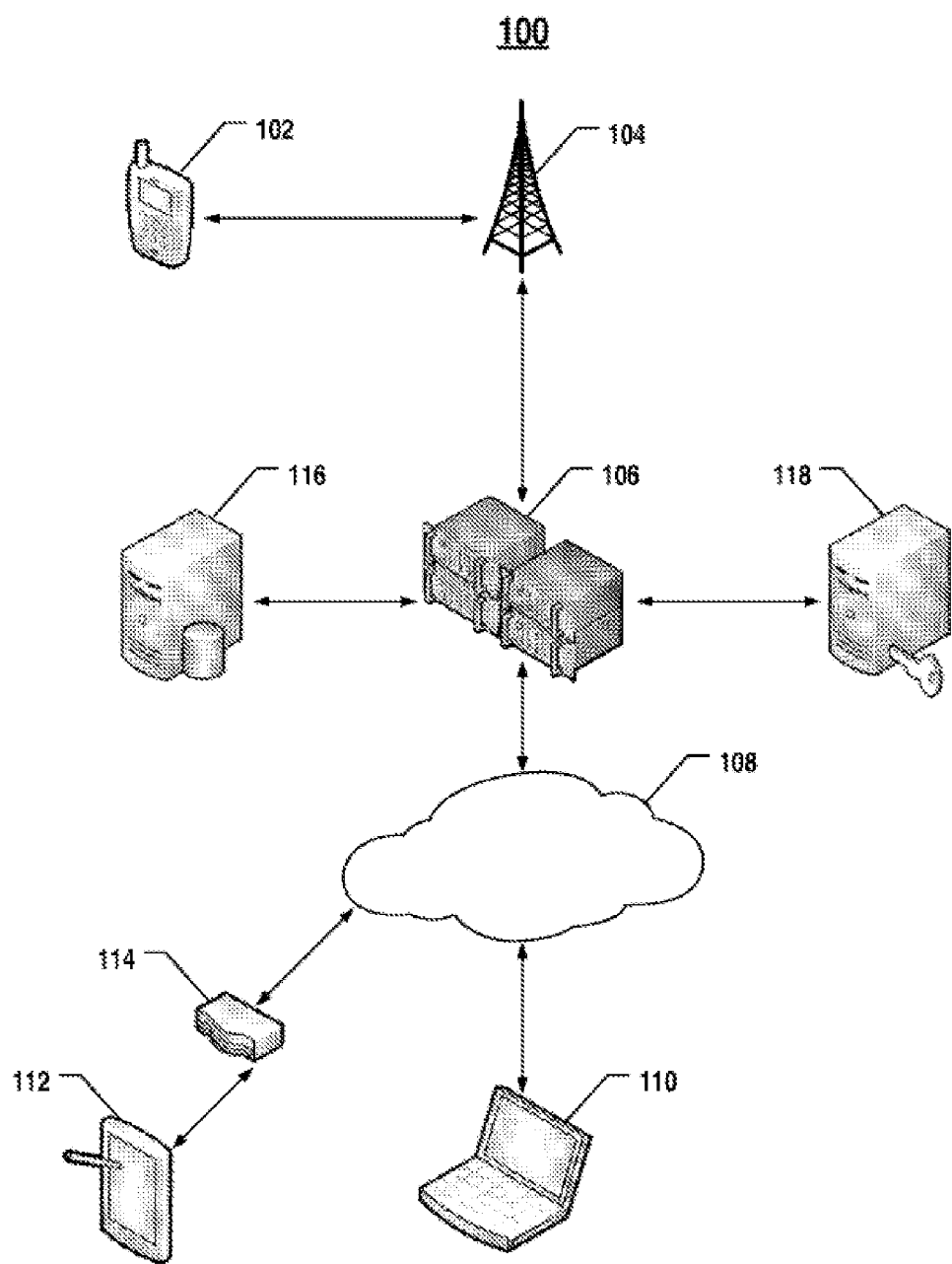
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as GSM. An OFDMA network may implement a RAT, such as LTE or NR. The techniques described herein may be used for the wireless networks and RATs mentioned above, as well as other wireless networks and RATs.

One of the drawbacks of conventional OFDM waveforms used in the 4G and 5G wireless networks, such as CP-OFDM, is the large out-of-band (OOB) emissions, despite its ability to inhibit ISI between successive OFDM symbols. These emissions are undesirable and may cause harmful interference to adjacent channels. WOLA is a technique in digital signal processing to effectively reduce the OOB emissions by smoothing the edges between two adjacent OFDM symbols. WOLA-OFDM is based on CP-OFDM where a portion of the OFDM symbol is appended at the end overlapping with the beginning of the next OFDM symbol. In addition, time-domain windowing using a pulse with soft edges can be applied to the appended portion, compared with a rectangular pulse in conventional OFDM. This leads to superior spectral containment and allows a smooth transition from one symbol to the next, which leads to better OOB attenuation compared with CP-OFDM.

Some solutions implement WOLA before digital gain adjustment either on a baseband chip or an RF chip. For example, in conventional solutions, WOLA on OFDM symbols are applied before the digital gain adjustment is implemented. However, as digital gain adjustment will disrupt the already smoothed edges between two adjacent OFDM symbols (e.g., smoothed by applying WOLA) and thus break up the smooth transition between OFDM symbols, WOLA is more effective attenuating the OOB emissions when implemented after digital gain adjustment is applied. In other words, in conventional solutions, applying digital gain adjustment after WOLA is implemented on OFDM symbols may not achieve satisfying OOB emissions attenuation effect. This impacts the performance of the wireless networks. Some other solutions tried to implement WOLA on the OFDM symbols using an RF chip in which a sample buffer, which is large enough to store the entire OFDM symbol, exists for applying WOLA on each OFDM symbol. The large buffer, which is uncommon for an RF chip, can significantly increase the cost of the RF chip and cause delay and thus, is undesirable. Moreover, storing the entire OFDM symbol in the buffer disrupts the OFDM symbols streaming through the RF chip. That is, WOLA on OFDM symbols may not be applied using an RF chip in a streamlined manner by the known solutions, which further impacts the performance of the RF chip.

Various embodiments in accordance with the present disclosure provide improved solutions for implementing WOLA on OFDM symbols after digital gain adjustment is applied (e.g., apply WOLA to OFDM symbols having the adjusted gains). By implementing WOLA on OFDM symbols after applying digital gain adjustment, the smoothed edges between two adjacent OFDM symbols will not later be broken up by digital gain adjustment. In some embodiments, a baseband chip is used for adjusting digital gains first and then for implementing WOLA on the OFDM symbols having the adjusted gains. In some other embodiments, a baseband chip is used for adjusting digital gains first, and then an RF chip is used for implementing WOLA on the OFDM symbols having the adjusted gains received from the baseband chip in a streamlined manner. In further some embodiments, an RF chip, instead of a baseband chip, is used for adjusting digital gains first and then implementing WOLA on the OFDM symbols having the adjusted gains, which can further reduce the dynamic range of data, data throughput, and power consumption at the digital interface between the baseband chip and the RF chip. In still some embodiments, a baseband chip is used for adjusting digital gains to a target level first and then implementing WOLA on the OFDM symbols having the adjusted gains. The baseband chip is further used for applying an inverse digital gain to the WOLA-OFDM symbols (e.g., OFDM symbols with smoothed edges) to restore the original gains of the OFDM symbols before transmitting the OFDM symbols to an RF chip (e.g., restore gains of the stream of OFDM symbols having the adjusted gains to original gain levels). The RF chip is used for adjusting the digital gains of the OFDM symbols received from the baseband chip to the target level again. This can also reduce the dynamic range of data, data throughput, and power consumption at the digital interface between the baseband chip and the RF chip.

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 11:
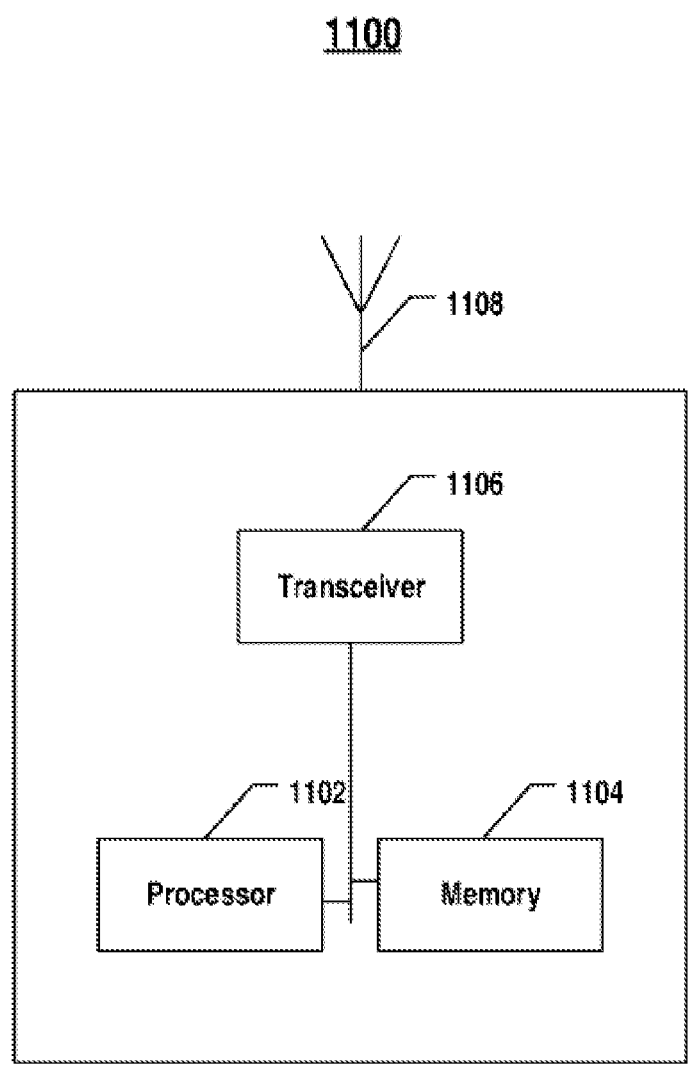
FIG. 11 illustrates a block diagram of an exemplary node, according to some embodiments of the present disclosure.

Each element in FIG. 1 may be considered a node of wireless network 100. More detail regarding the possible implementation of a node is provided by way of example in the description of a node 1100 in FIG. 11. Node 1100 may be configured as user equipment 102, access node 104, or core network element 106 in FIG. 1. Similarly, node 1100 may also be configured as computer 110, router 114, tablet 112, database 116, or authentication server 118 in FIG. 1. As shown in FIG. 11, node 1100 may include a processor 1102, a memory 1104, and a transceiver 1106. These components are shown as connected to one another by a bus, but other connection types are also permitted. When node 1100 is user equipment 102, additional components may also be included, such as a user interface (UI), sensors, and the like. Similarly, node 1100 may be implemented as a blade in a server system when node 1100 is configured as core network element 106. Other implementations are also possible.

Transceiver 1106 may include any suitable device for sending and/or receiving data. Node 1100 may include one or more transceivers, although only one transceiver 1106 is shown for simplicity of illustration. An antenna 1108 is shown as a possible communication mechanism for node 1100. Multiple antennas and/or arrays of antennas may be utilized. Additionally, examples of node 1100 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 11, node 1100 may include processor 1102. Although only one processor is shown, it is understood that multiple processors can be included. Processor 1102 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 1102 may be a hardware device having one or more processing cores. Processor 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 11, node 1100 may also include memory 1104. Although only one memory is shown, it is understood that multiple memories can be included. Memory 1104 can broadly include both memory and storage. For example, memory 1104 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 1102. Broadly, memory 1104 may be embodied by any computer-readable medium, such as a non-transitory computer-readable medium.

Processor 1102, memory 1104, and transceiver 1106 may be implemented in various forms in node 1100 for performing wireless communication functions. In some embodiments, processor 1102, memory 1104, and transceiver 1106 of node 1100 are implemented (e.g., integrated) on one or more system-on-chips (SoCs). In one example, processor 1102 and memory 1104 may be integrated on an application processor (AP) SoC (sometimes known as a "host," referred to herein as a "host chip") that handles application processing in an operating system environment, including generating raw data to be transmitted. In another example, processor 1102 and memory 1104 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 1102 and transceiver 1106 (and memory 1104 in some cases) may be integrated on an RF SoC (sometimes known as a "transceiver," referred to herein as a "RF chip") that transmits and receives RF signals with antenna 1108. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104 via an uplink (UL), may implement WOLA on OFDM symbols after the gain adjustment is applied, instead of before the gain adjustment is applied, as described below in detail. As a result, compared with known solutions, the continuity between adjacent WOLA-OFDM symbols in the time domain and the smooth transition at the boundary edges can be maintained.

Figure 2:
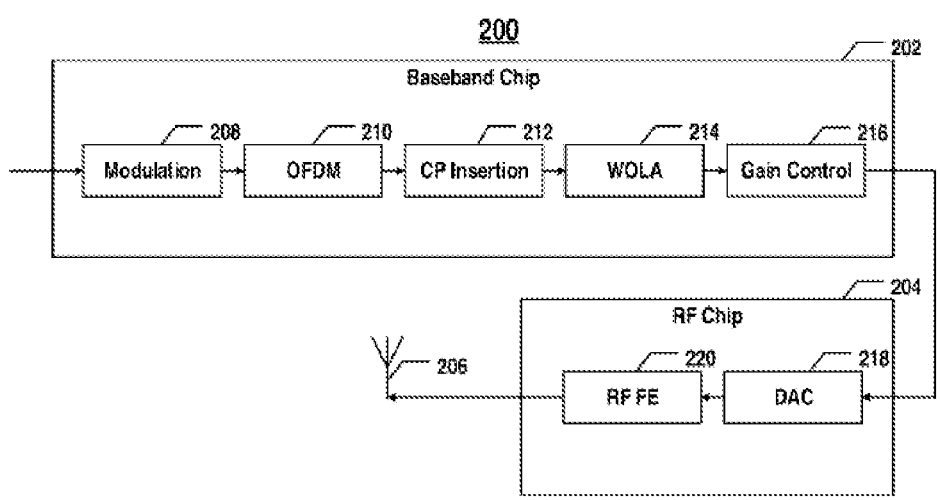
FIG. 2 illustrates a block diagram of an apparatus including a baseband chip implementing WOLA on OFDM symbols and an RF chip.

As one example of known solutions, FIG. 2 illustrates a block diagram of an apparatus 200 including a baseband chip 202 implementing WOLA on OFDM symbols before adjusting a digital gain and an RF chip 204. Apparatus 200 includes baseband chip 202 configured to generate and transmit WOLA-OFDM symbols to RF chip 204. RF chip 204, operatively coupled to baseband chip 202 and an antenna 206, is configured to transmit WOLA-OFDM symbols in RF signals through antenna 206. Baseband chip 202 includes a modulation module 208, an OFDM module 210, a cyclic prefix (CP) insertion module 212, a WOLA module 214, and a gain control module 216 in the uplink. RF chip 204 includes a digital-to-analog converter (DAC) 218 and an RF front-end (FE) 220 in the uplink. It is understood that additional modules in the downlink of baseband chip 202 and RF chip 204 are omitted for ease of description.

CP-OFDM symbols are generated after being processed by CP insertion module 212 and are fed into WOLA module 214 for applying WOLA to each CP-OFDM symbol in baseband chip 202 to generate WOLA-OFDM symbols. When performing CP insertion and WOLA, the entire CP-OFDM symbol is stored in a buffer (not shown) of baseband chip 202, and the samples in the OFDM symbol forming the cyclic prefix or cyclic suffix are copied based on memory addressing in the buffer. The gain (e.g., power or amplitude) of each WOLA-OFDM symbol is then adjusted by gain control module 216 of baseband chip 202. As a result, WOLA-OFDM symbols having the adjusted gains are transmitted from baseband chip 202 to RF chip 204. The digital interface (not shown) in baseband chip 202 transmitting the WOLA-OFDM symbols and the digital interface (not shown) in RF chip 204 receiving the WOLA-OFDM symbols may need to accommodate WOLA-OFDM symbols at various gain levels and the resulting large data throughput and power consumption. Most importantly, the continuity between adjacent WOLA-OFDM symbols in the time domain (e.g., the smoothed edges between adjacent OFDM symbols) may be broken up by the subsequent gain adjustment applied to WOLA-OFDM symbols at various power levels.

In contrast, FIGS. 3-6 illustrate block diagrams of improved exemplary apparatus where WOLA is implemented on OFDM symbols after a digital gain of the OFDM symbols are adjusted. Apparatus disclosed in FIGS. 3-6 may be examples of any suitable node of wireless network 100, such as user equipment 102. By applying WOLA after the digital gain adjustment, the continuity between adjacent WOLA-OFDM symbols in the time domain, and the smooth transition at the boundary edges can also be maintained. This can significantly reduce the OOB drawbacks of using OFDM waveforms in the 4G and 5G wireless networks. It is understood besides WOLA, that other suitable pulse-shaping approaches, such as channel filtering, may also be similarly applied to the stream of OFDM symbols (e.g., be interchangeable with WOLA) for overcoming the OOB emission drawback as described below in details.

Figure 3:
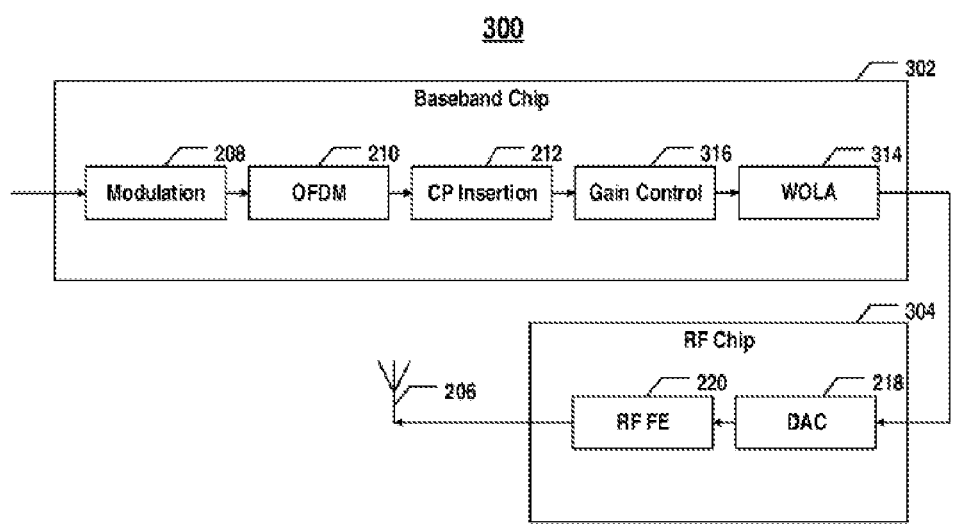
FIG. 3 illustrates a block diagram of an exemplary apparatus including a baseband chip implementing WOLA on OFDM symbols after adjusting a digital gain and an RF chip, according to some embodiments of the present disclosure.

For one example, FIG. 3 illustrates a block diagram of an exemplary apparatus 300 including a baseband chip 302 implementing WOLA on OFDM symbols after adjusting the digital gain and an RF chip 204, according to some embodiments of the present disclosure. For the ease of illustration, the details of the same structures in both apparatuses 200 and 300 are not repeated for ease of description. In some embodiments, baseband chip 302 is implemented by processor 1102 and memory 1104, and RF chip 304 is implemented by processor 1102, memory 1104, and transceiver 1106, as described above with respect to FIG. 11. It is understood that besides the various modules of baseband chip 302 and RF chip 304 in the uplink shown in FIG. 3, any other suitable modules, such as modules in the downlink, may be included in baseband chip 302 and RF chip 304 as well.

As shown in FIG. 3, different from WOLA module 214 and gain control module 216 in baseband chip 202, a WOLA module 314 applies WOLA to the OFDM symbols to generate WOLA-OFDM symbols after the gain (e.g., power or amplitude) of each OFDM symbol is adjusted by gain control module 316 (e.g., apply WOLA to the OFDM symbols having the adjusted gains) in baseband chip 302. As a result, WOLA is applied to the OFDM symbols having the adjusted gains. As no digital gain adjustment is applied to the WOLA-OFDM symbols after the edges between adjacent OFDM symbols are smoothed (e.g., by applying WOLA to the OFDM symbols), the continuity between adjacent WOLA-OFDM symbols in the time domain (e.g., the smooth transition at the boundary edges) can be maintained.

Figure 4:
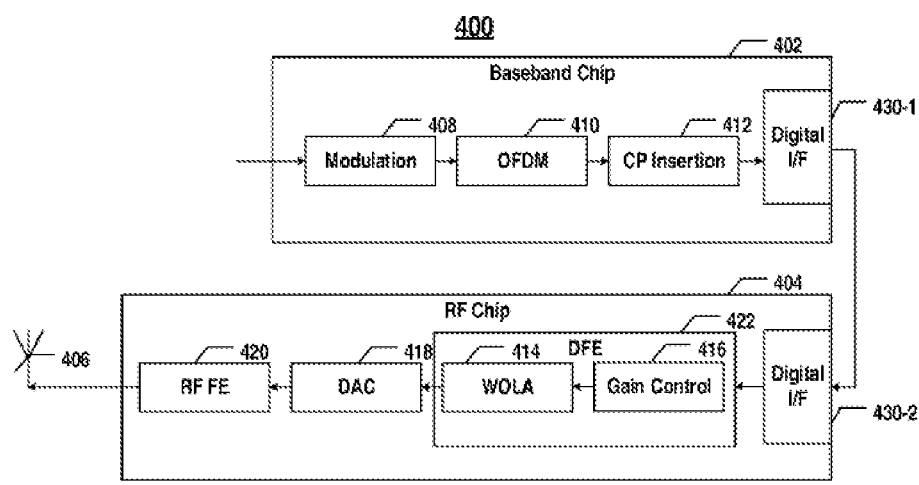
FIG. 4 illustrates a block diagram of an exemplary apparatus including a baseband chip and an RF chip implementing WOLA and a digital gain on the OFDM symbols where WOLA is applied after adjusting the digital gain, according to some embodiments of the present disclosure.

For another example, FIG. 4 illustrates a block diagram of an exemplary apparatus 400 including a baseband chip 402 and an RF chip 404 implementing WOLA and the digital gain on the OFDM symbols where WOLA is applied after adjusting the digital gain, according to some embodiments of the present disclosure. Compared to apparatus 300, as described below in detail, by transmitting OFDM or CP-OFDM symbols without WOLA and adjusted gains to RF chip 404 and implementing WOLA on the OFDM or CP-OFDM symbols (and gain control) using RF chip 404, the design of the digital interfaces in baseband chip 402 and RF chip 404 (e.g., digital interfaces 430-1 and 430-2) can be simplified, and the power consumption can be reduced. Moreover, as WOLA is applied after the gain adjustment, the continuity between adjacent WOLA-OFDM symbols in the time domain and the smooth transition at the boundary edges can also be maintained. As shown in FIG. 4, apparatus 400 may include baseband chip 402, RF chip 404, and an antenna 406. In some embodiments, baseband chip 402 is implemented by processor 1102 and memory 1104, and RF chip 404 is implemented by processor 1102, memory 1104, and transceiver 1106, as described above with respect to FIG. 11. It is understood that besides the various modules of baseband chip 402 and RF chip 404 in the uplink shown in FIG. 4, any other suitable modules, such as modules in the downlink, may be included in baseband chip 402 and RF chip 404 as well.

In some embodiments, baseband chip 402 includes a modulation module 408, an OFDM module 410, and a cyclic prefix (CP) insertion module 412 in the uplink. Modulation module 408 may be configured to modulate the raw data from a host chip or raw data after coding (e.g., source coding and/or channel coding) using any suitable modulation techniques, such as multi-phase pre-shared key (MPSK) modulation or quadrature amplitude modulation (QAM). OFDM module 410 may be configured to generate a stream of OFDM symbols on multiple subcarriers based on the modulated data. In some embodiments, OFDM module 410 includes a serial-to-parallel converter, an inverse fast Fourier transform (IFFT) unit, and a parallel-to-serial converter. Cyclic prefix insertion module 412 may be configured to insert a cyclic prefix (e.g., the last portion of the OFDM symbol) at the beginning of each OFDM symbol with guard interval exceeding delay spread of the multipath channel to mitigate the effect of ISI. A stream of CP-OFDM symbols thus can be generated by cyclic prefix insertion module 412 and transmitted through a digital interface 430-1 without applying WOLA and digital gain adjustment, i.e., with more uniform symbol levels, smaller dynamic data range and throughout, and reduced power consumption at digital interface 430-1 of baseband chip 402, compared with the examples shown in FIGS. 2 and 3. In some embodiments, a gain control signal indicating target gain levels for the stream of OFDM symbols and symbol boundary information indicating boundaries of the stream of OFDM symbols may be provided by any suitable modules in baseband chip 402 (e.g., modulation module 408, OFDM module 410, and/or Cyclic prefix insertion module 412). The gain control signal and the symbol boundary information can be transmitted through digital interface 430-1 along with the stream of the OFDM symbols. In some embodiments, additional information associated with WOLA implementation, such as the length of the overlap may also be transmitted along with the stream of OFDM symbols to facilitate WOLA module 414 to perform the improved WOLA implementation on streamed symbols using RF chip 404 disclosed herein.

Figure 7:
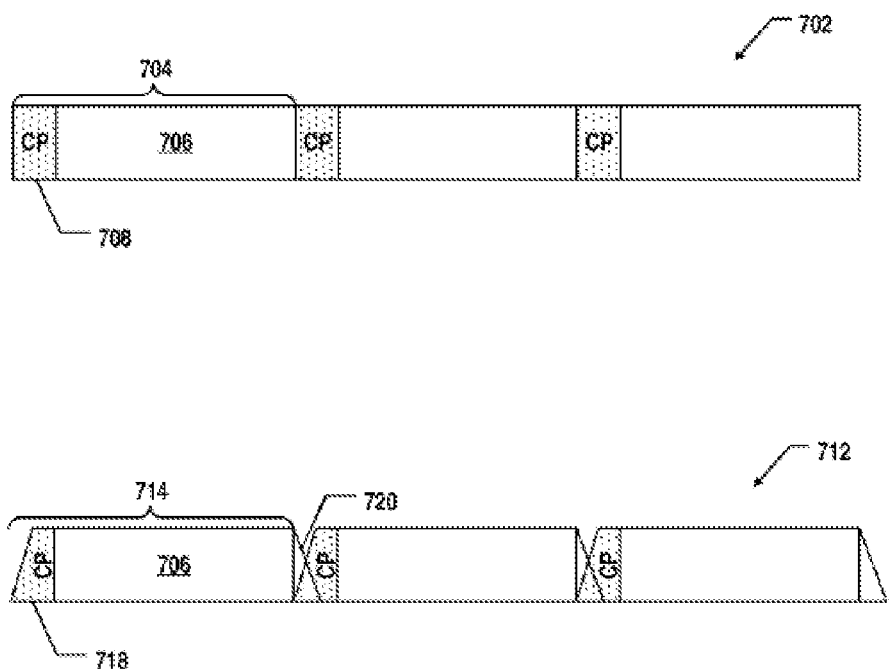
FIG. 7 illustrates exemplary CP-OFDM symbols and WOLA-OFDM symbols, according to some embodiments of the present disclosure.

For example, FIG. 7 illustrates a stream 702 of CP-OFDM symbols 704 in the time domain. Each CP-OFDM symbol 704 may include a payload 706 carrying data and a cyclic prefix 708 at the beginning of CP-OFDM symbol 704, which can preserve the orthogonality of the subcarriers and serve as a guard interval preventing ISI between successive CP-OFDM symbols 704. When the signal is demodulated, the N-point fast Fourier transform (FFT) is taken at payload 706 after cyclic prefix 708. In some embodiments, the last portion of payload 706 (e.g., some samples at the end of payload 706) of CP-OFDM symbol 704 is inserted at the beginning of payload 706 of CP-OFDM symbol 704 as cyclic prefix 708.

Referring back to FIG. 4, RF chip 404 may include a digital front-end (FE) 422, a digital-to-analog converter (DAC) 418, and an RF front-end (FE) 420 in the uplink. Digital front-end 422 may be implemented by processor 1102 shown in FIG. 11, such as one or more MCUs and/or DSPs. Digital front-end 422 may include any elements that process digital signals in RF chip 404 before digital-to-analog converter 418 that converts the digital signals into analog signals (e.g., RF signals) for RF front-end 420 to process. In some embodiments, digital front-end 422 includes a gain control module 416 and a WOLA module 414. Gain control module 416 may be configured to receive a stream of CP-OFDM symbols (without WOLA and gain adjustment) from baseband chip 402 through a digital interface 430-2 and perform digital gain adjustment on the stream of CP-OFDM symbols. For example, gain control module 416 may be configured to adjust the gain (power or amplitude) of each CP-OFDM symbol prior to applying WOLA on the CP-OFDM symbols based on a gain control signal indicating target gain levels for the stream of CP-OFDM symbols. For example, the target gain level may be determined for each OFDM symbol in the stream of CP-OFDM symbols, or a group of OFDM symbols in the stream of CP-OFDM symbols over a period of time (e.g., 1, 2, 5, or 10 seconds). In some embodiments, the gain control signal may be generated by baseband chip 402 (e.g., modulation module 408 and/or OFDM module 410) and may be received by gain control module 416 along with the stream of CP-OFDM symbols. Additional elements may be included in digital front-end 422 to perform any other front-end functions on digital signals, such as filtering, up-conversion, or sample-rate conversion.

As described below in detail, WOLA module 414 of digital front-end 422 in RF chip 404 may be configured to apply WOLA to the stream of CP-OFDM symbols having the adjusted gains in a streamlined manner. That is, WOLA module 414 can generate a stream of WOLA-OFDM symbols after digital gain adjustment in real-time without storing an entire symbol in a large buffer in RF chip 404. In some embodiments, WOLA module 414 is configured to copy a portion of each CP-OFDM symbol as a cyclic suffix and append the copied cyclic suffix to the end of the CP-OFDM symbol with a ramping-down window to form a weighed cyclic suffix. Different from some known solutions in which the entire symbol needs to be stored into and then retrieved from a buffer in order to copy the cyclic suffix by memory addressing, which breaks the continuous flow of the streamed symbols, WOLA module 414 may identify the exact location and length of the samples in the CP-OFDM symbol forming the cyclic suffix based on a symbol boundary signal and preset lengths of the cyclic prefix and cyclic suffix identified from the symbol boundary information and the additional information associated with WOLA implementation received from baseband chip 402. As a result, WOLA module 414 may store only the identified portion in a buffer with a much smaller size fitting the cyclic suffix size (e.g., not greater than 100 bytes vs. 2-4 Kbytes). The CP-OFDM symbols thus may continue streaming through digital front-end 422 in RF chip 404 as WOLA module 414 is applying WOLA on the streamed CP-OFDM symbols, i.e., in a streamlined manner. Thus, compared with the known solutions, the delay and cost due to the large-sized buffer can be reduced in RF chip 404 of apparatus 400.

For example, FIG. 7 illustrates a stream 712 of WOLA-OFDM symbols 714 in the time domain. Each WOLA-OFDM symbol 714 may include a weighted cyclic prefix 718 at the beginning of WOLA-OFDM symbol 714, followed by payload 706. A weighted cyclic suffix 720 may be appended to the end of WOLA-OFDM symbol 714. Weighted cyclic prefix 718 and weighted cyclic suffix 720 may be formed by a windowing process that applies a ramping-up window and ramping-down window (weights), respectively. In some embodiments, the last portion of payload 706 (e.g., some samples at the end of payload 706) of WOLA-OFDM symbol 714 is multiplied with a ramping-up window and inserted at the beginning of payload 706 of CP-OFDM symbol 704 as weighted cyclic prefix 718. In some embodiments, the beginning portion of payload 706 (e.g., some samples at the beginning of payload 706) of WOLA-OFDM symbol 714 is multiplied with a ramping-down window and appended to the end of payload 706 of CP-OFDM symbol 704 as weighted cyclic suffix 720. As weighted cyclic suffix 720 of each WOLA-OFDM symbol 714 may overlap weighted cyclic prefix 718 of the next WOLA-OFDM symbol 714, the summation of weighted cyclic suffix 720 and weighted cyclic prefix 718 of successive WOLA-OFDM symbols 714 can form a smooth transition between the boundaries of successive WOLA-OFDM symbols 714, which helps to reduce the OOB emissions.

Referring back to FIG. 4, digital-to-analog converter 418 may be configured to convert the stream of WOLA-OFDM symbols in digital signals into analog signals (e.g., radio signals). RF front-end 420 (also known as "analog front-end") may include any elements between antenna 406 and digital-to-analog converter 418, which handles analog signals. RF front-end 420 may include, for example, RF filters, RF amplifiers, local oscillators, and mixers.

Figure 8:
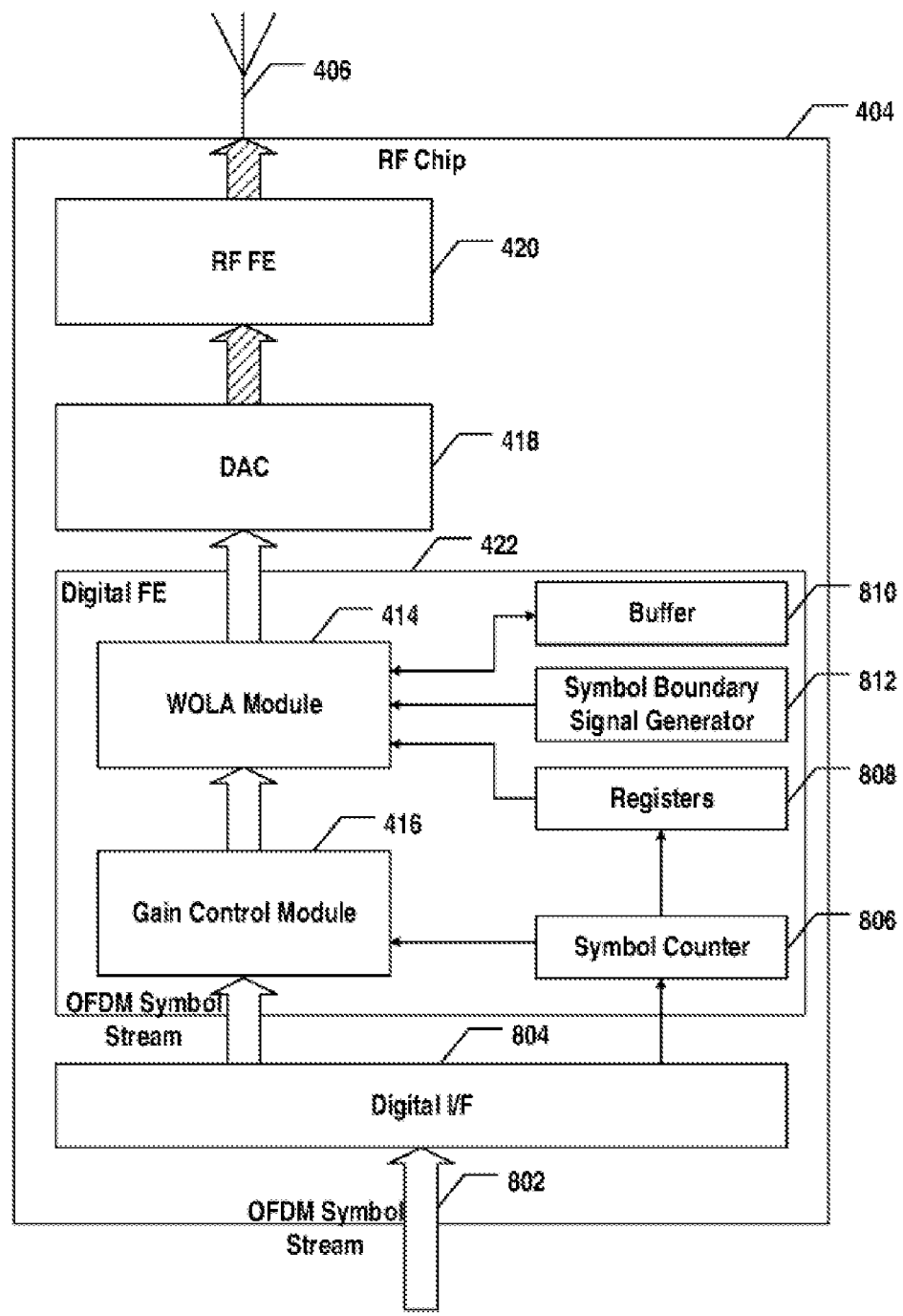
FIG. 8 illustrates a detailed block diagram of an exemplary RF chip of the apparatus shown in FIG. 4, according to some embodiments of the present disclosure.

FIG. 8 illustrates a detailed block diagram of exemplary RF chip 404 of apparatus 400 shown in FIG. 4, according to some embodiments of the present disclosure. As described above with respect to FIG. 4, RF chip 404 may include a digital interface (I/F) 804 (e.g., digital interface 430-2 in FIG. 4), digital front-end 422 including gain control module 416, and WOLA module 414, digital-to-analog converter 418, and RF front-end 420. As shown in FIG. 8, in some embodiments, digital front-end 422 may further include a symbol counter 806, a set of registers 808, a buffer 810, and a symbol boundary signal generator 812, which facilitate WOLA module 414 to perform the improved WOLA implementation on streamed symbols using RF chip 404 disclosed herein.

In some embodiments, digital interface 804 is configured to receive a stream of OFDM symbols 802 (e.g., CP-OFDM symbols) along with the symbol boundary information, the additional information associated with WOLA implementation, and the gain control information (e.g., indicated by the gain control signal) from a baseband chip, such as baseband chip 402 in FIG. 4. The stream of OFDM symbols generated by the baseband chip may be free of WOLA and adjusted gains, which has a relatively small dynamic data range, data throughput, and less impact on the power consumption of digital interface 804. Streamed OFDM symbols 802 may be received by digital interface 804 and transmitted to digital front-end 422 as a continuous data flow. In some embodiments, gain control module 416 is configured to adjust gains of the stream of OFDM symbols 802 received from the baseband chip through digital interface 804. In some embodiments, OFDM symbols 802 may be received along with symbol boundary information indicative of boundaries of the stream of OFDM symbols, additional information associated with WOLA implementation, and gain control information (e.g., indicated by the gain control signal) indicating target gain levels of the stream of OFDM symbols 802. In some embodiments, the symbol boundary information, the additional information associated with WOLA implementation, and the gain control information may be values indicating such as the addressing of cyclic prefix, the lengths of the cyclic prefix, cyclic suffix, the target gain level, etc. The gain control information may be generated by any suitable module of baseband chip 402 as described above and may be used to facilitate the gain adjustment.

In some embodiments, symbol boundary signal generator 812 is configured to periodically generate symbol boundary signals each indicative of the beginning of a respective cyclic prefix of each OFDM symbol of streamed OFDM symbols 802 based on the symbol boundary information and the additional information associated with WOLA implementation received from baseband chip 402. For a CP-OFDM symbol including a cyclic prefix at the beginning of the OFDM symbol, symbol boundary signals may be generated by symbol boundary signal generator 812 in the same repetition rate as streamed OFDM symbols 802 (e.g., synchronized with streamed OFDM symbols 802), such that each symbol boundary signal may be aligned with the beginning of a respective CP-OFDM symbol. Each symbol boundary signal may be a pulse generated by any suitable circuits, such as a pulse generator, synchronization circuits, and clock circuits, in symbol boundary signal generator 812.

In some embodiments, registers 808 in digital front-end 422 are configured to store a set of preset lengths of cyclic prefix and cyclic suffix based on the symbol boundary information and the additional information associated with WOLA implementation. For example, registers 808 may store the length of the cyclic prefix and the length of the cyclic suffix, respectively. Registers 808 may be implemented by memory 1104 in FIG. 11 and may include, for example, a ROM in case the set of preset lengths of cyclic prefix and cyclic suffix do not change, or a RAM in case one or more of the preset lengths of cyclic prefix and cyclic suffix may be updated. The size of registers 808 is relatively small, for example, just enough for storing the values of the preset lengths of cyclic prefix and cyclic suffix (e.g., not greater than 10 bytes). The preset lengths of cyclic prefix and cyclic suffix may be determined based on the symbol boundary information and the additional information associated with WOLA implementation, and may be defined based on any relevant standards, such as from the 3rd Generation Partnership Project (3GPP), or the specification from the manufacturers and/or operators (e.g., cellular service providers) of baseband chip 402 and/or RF chips 404.

In some embodiments, WOLA module 414 in digital front-end 422 is configured to copy a portion of each OFDM symbol in streamed OFDM symbols 802 identified based on the respective symbol boundary signal, the length of the cyclic prefix, and the length of the cyclic suffix. WOLA module 414 may be configured to first identify the beginning of the copied portion of the respective OFDM symbol based on the respective symbol boundary signal and the length of the cyclic prefix, and then determine the length of the copied portion of the respective OFDM symbol based on the length of the cyclic suffix. WOLA module 414 may obtain the preset lengths of cyclic prefix and cyclic suffix of each OFDM symbol from register 808 for identifying the portion forming the cyclic suffix in the perspective OFDM symbol.

Figure 10:
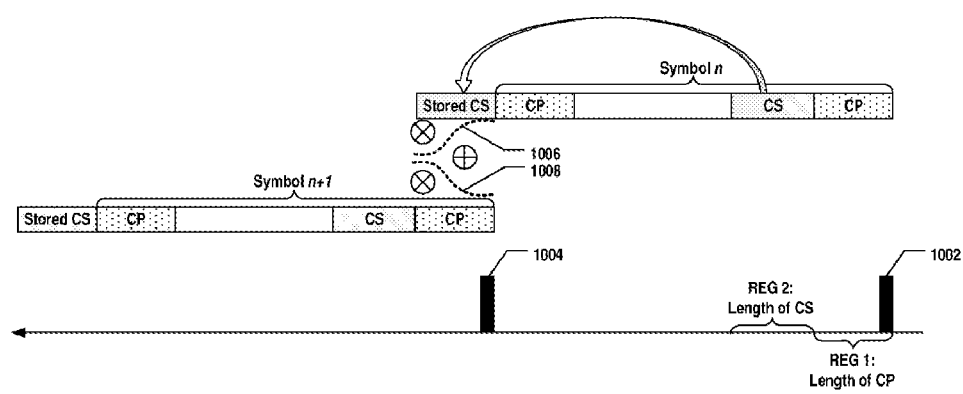
FIG. 10 illustrates an exemplary WOLA implementation on streamed CP-OFDM symbols, according to some embodiments of the present disclosure.

For example, FIG. 10 illustrates an exemplary WOLA implementation on streamed CP-OFDM symbols, according to some embodiments of the present disclosure. As shown in FIG. 10, a portion (CS) of a CP-OFDM symbol n may be identified based on a symbol boundary signal 1002 corresponding to symbol n, which indicates (e.g., being aligned with) the beginning of symbol n (e.g., the beginning of the cyclic prefix (CP)), the length of CP stored in a first register (REG 1), and the length of CS stored in a second register (REG 2). For example, as CS may be the first portion of the payload in symbol n, i.e., the portion immediately after CP, the beginning of CS may be identified based on symbol boundary signal 1002 and the length of CP in REG 1, i.e., the sample after the length of CP from symbol boundary signal 1002. The length of CS may be determined based on the length of CS in REG 2. For example, assuming the lengths of CP and CS are x samples and y samples, respectively, CS may be identified as the y samples from the (x+1)th sample to the (x+y+1)th sample in symbol n.

Referring back to FIG. 8, buffer 810 is configured to store the copied portion of the OFDM symbol, according to some embodiments. Buffer 810 may be implemented by memory 1104 of FIG. 11, e.g., SRAM. Different from known solutions that need a large buffer to store the entire OFDM symbol (e.g., having a size of 2-4 Kbytes), by identifying the exact portion forming the cyclic suffix in the OFDM symbol as the OFDM symbol streams through digital front-end 422, buffer 810 can have a much smaller size for storing just the identified portion, but not the entire OFDM symbol. In some embodiments, the size of buffer 810 is not greater than 100 bytes. In some embodiments, to copy the identified portion of the OFDM symbol, WOLA module 414 is configured to store the identified portion into buffer 810 as the OFDM symbol streams through digital front-end 422, and retrieve the stored portion from buffer 810 in response to the end of the OFDM symbol reaching digital front-end 422.

In some embodiments, WOLA module 414 of digital front-end 422 is further configured to append the copied portion to the end of the respective OFDM symbol with a ramping-down window to form a weighed cyclic suffix of the respective OFDM symbol. WOLA module 414 may first perform a windowing process, for example, by multiplying the copied portion with a weight (e.g., a ramping-down window), and then append the weighted copied portion to the end of the OFDM symbol as the weighted cyclic suffix of the OFDM symbol. The weighed cyclic suffix of each OFDM symbol may overlap the cyclic prefix of another OFDM symbol next to the respective OFDM symbol. A windowing process may be performed on the cyclic prefix of each OFDM symbol as well, for example, by multiplying the cyclic prefix with a weight (e.g., a ramping-up window) by, for example, cyclic prefix insertion module 412 in baseband chip 402 or WOLA module 414 in RF chip 304. The weighted cyclic prefix and weighed cyclic suffix of successive OFDM symbols may overlap at the symbol boundary, forming a smooth transition to reduce the OOB emissions.

As shown in FIG. 10, CS of symbol n, identified based on symbol boundary signal 1002, the length of CP, and the length of CS, may be stored into a buffer (e.g., buffer 810 in FIG. 8) while symbol n continues to stream. In response to reaching the end of symbol n, CS stored in the buffer (stored CS) may be retrieved from the buffer and appended to the end of symbol n when symbol n streams to its end. Stored CS may be weighed by multiplying a ramping-down window 1006. During the course of applying WOLA to form stored CS, symbol n is not stored in a buffer, but keeps streaming through, for example, digital front-end 422 of RF chip 404, i.e., in a streamlined manner. As shown in FIG. 10, stored CS of symbol n may overlap CP of symbol n+1 next to symbol n, which is indicated by next symbol boundary signal 1004. CP of symbol n+1 may be weighed by multiplying a ramping-up window 1008, and the overlapped weighed CP of symbol n+1 and weighed stored CS of symbol n may be added to form a smooth transition between symbol n and symbol n+1. As symbol n+1 continues to flow, the same WOLA process described above with respect to symbol n may be repeated for symbol n+1.

Referring back to FIG. 8, in some embodiments, symbol counter 806 is configured to count the number of OFDM symbols in a slot. For example, symbol counter 806 may count the number of OFDM symbols streaming through digital interface 804 and notify registers 808 to provide the corresponding length of the cyclic prefix to WOLA module 414 and/or notify gain control module 416 to apply the corresponding target gain to each OFDM symbols.

Referring back to FIG. 8, as described above, WOLA module 414 is configured to apply WOLA to the stream of OFDM symbols 802 having the adjusted gains in a streamlined manner, such that each OFDM symbol can sequentially stream through digital front-end 422, digital-to-analog converter 418, and RF front-end 420 without being stored in a large buffer. Digital-to-analog converter 418 is configured to convert the stream of OFDM symbols 802 from digital signals to analog signals (e.g., RF signals) before being processed by RF front-end 420 and transmitted by antenna 406, according to some embodiments.

Figure 5:
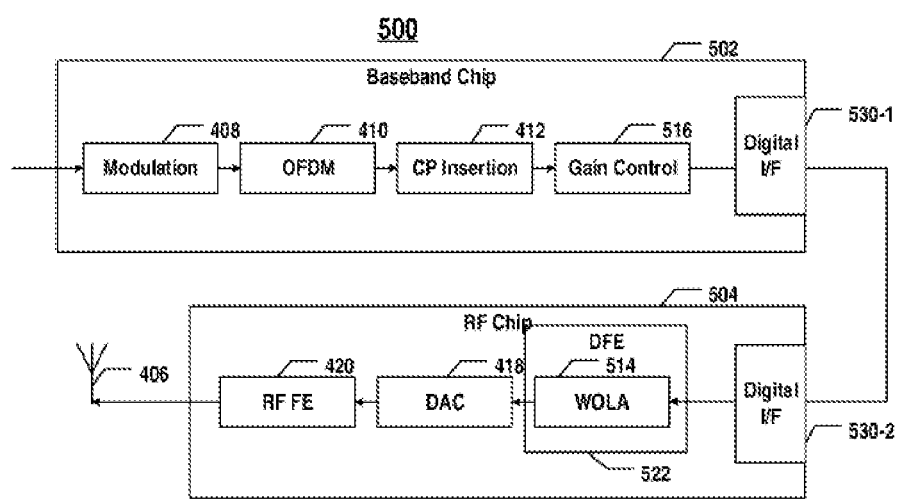
FIG. 5 illustrates a block diagram of an exemplary apparatus including a baseband chip implementing a digital gain on the OFDM symbols and an RF chip implementing WOLA on OFDM symbols with the adjusted gain, according to some embodiments of the present disclosure.

For still another example, FIG. 5 illustrates a block diagram of an exemplary apparatus 500 including a baseband chip 502 implementing the digital gain on the OFDM symbols and an RF chip 504 implementing WOLA on OFDM symbols with the adjusted gain, according to some embodiments of the present disclosure. Compared to apparatus 400, the digital gain adjustment is implemented by gain control module 516 of baseband chip 502 and then transmitted to RF chip 504 through the digital interfaces. This further ensures that WOLA is applied after the digital gain adjustment, and thus, the continuity between adjacent WOLA-OFDM symbols in the time domain and the smooth transition at the boundary edges can be maintained. For the ease of illustration, the details of the same structures in both apparatuses 400 and 500 are not repeated for ease of description. In some embodiments, baseband chip 502 is implemented by processor 1102 and memory 1104, and RF chip 504 is implemented by processor 1102, memory 1104, and transceiver 1106, as described above with respect to FIG. 11. It is understood that besides the various modules of baseband chip 502 and RF chip 504 in the uplink shown in FIG. 5, any other suitable modules, such as modules in the downlink, may be included in baseband chip 502 and RF chip 504 as well.

As shown in FIG. 5, different from digital front-end 422 including both gain control module 416 and WOLA module 414, a digital front-end 522 of RF chip 504 includes only WOLA module 514. The digital gain adjustment is applied by gain control module 516 of baseband chip 502. As described above, as OFDM symbols with the adjusted gain instead of OFDM symbols without adjusted gain are transmitted from baseband chip 502 to RF chip 504, the digital interface in RF chip 504 may need to have a larger dynamic data range, data throughput than digital interface 804 in RF chip 404.

Figure 9:
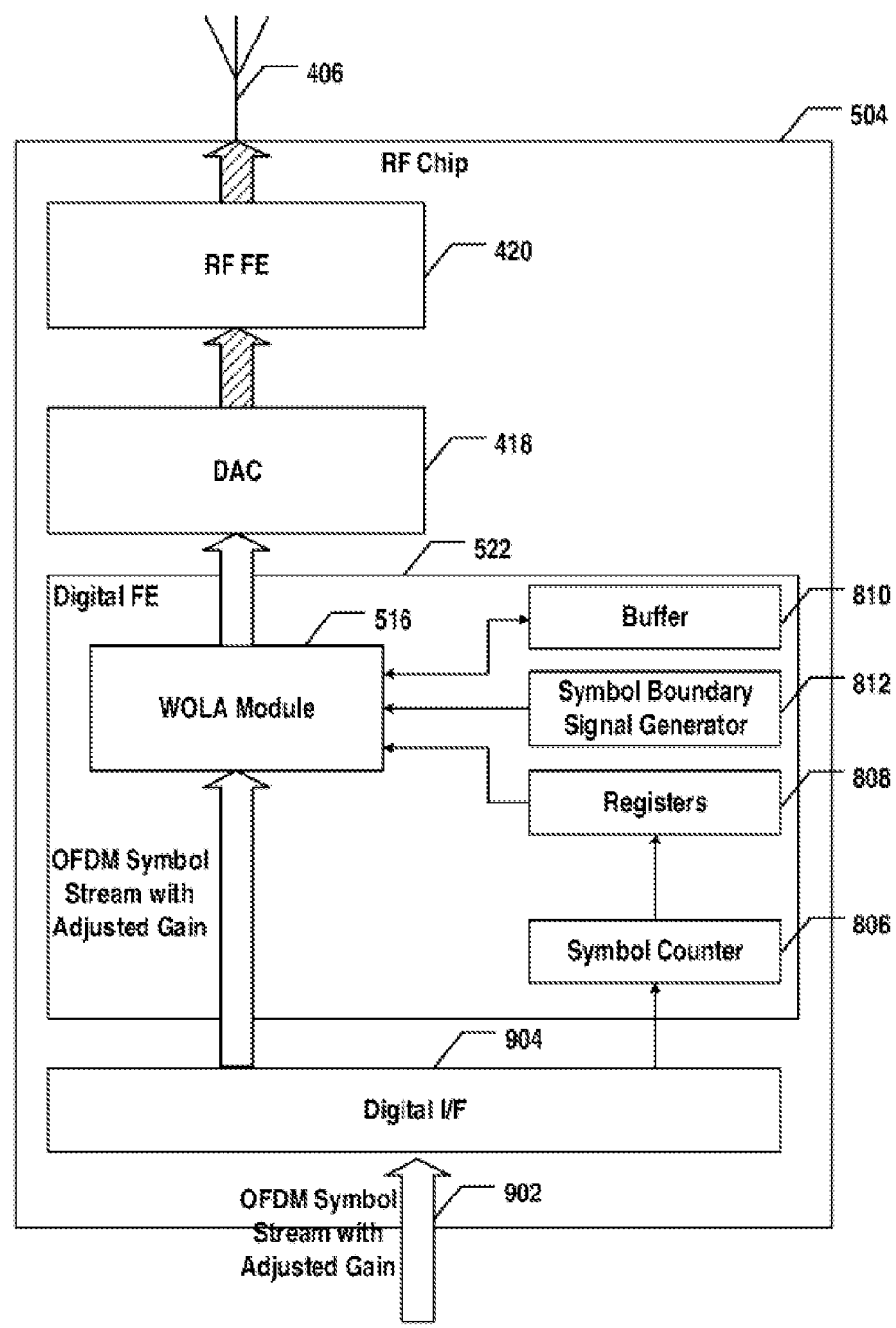
FIG. 9 illustrates a detailed block diagram of an exemplary RF chip of the apparatus shown in FIG. 5, according to some embodiments of the present disclosure.

FIG. 9 illustrates a detailed block diagram of exemplary RF chip 504 of apparatus 500 shown in FIG. 5, according to some embodiments of the present disclosure. Different from RF chip 404 shown in FIG. 8, in RF chip 504 OFDM symbols with the adjusted gain 902 along with symbol boundary information and the additional information associated with WOLA implementation instead of streamed OFDM symbols 802 along with symbol boundary information, the additional information associated with WOLA implementation, and gain control signal are transmitted from baseband chip 502 to RF chip 504, and digital front-end 522 of RF chip 504 only includes WOLA module 514. When implementing WOLA to the OFDM symbols with the adjusted gain, instead of receiving the OFDM symbols with the adjusted gain from gain control module 416 like WOLA module 414, as shown in FIG. 8, WOLA module 514 receives the OFDM symbols with the adjusted gain 902 directly from baseband chip 502 through digital interface 530-1 of baseband chip 502 and digital interface 904 (e.g., digital interface 530-2 of RF chip 504 as shown in FIG. 5). For the ease of illustration, the details of the same structures in both RF chips 404 and 504 are not repeated for ease of description. As describe above, digital interface 904 may need to have a larger dynamic data range, data throughput than digital interface 804 in RF chip 404.

Figure 6:
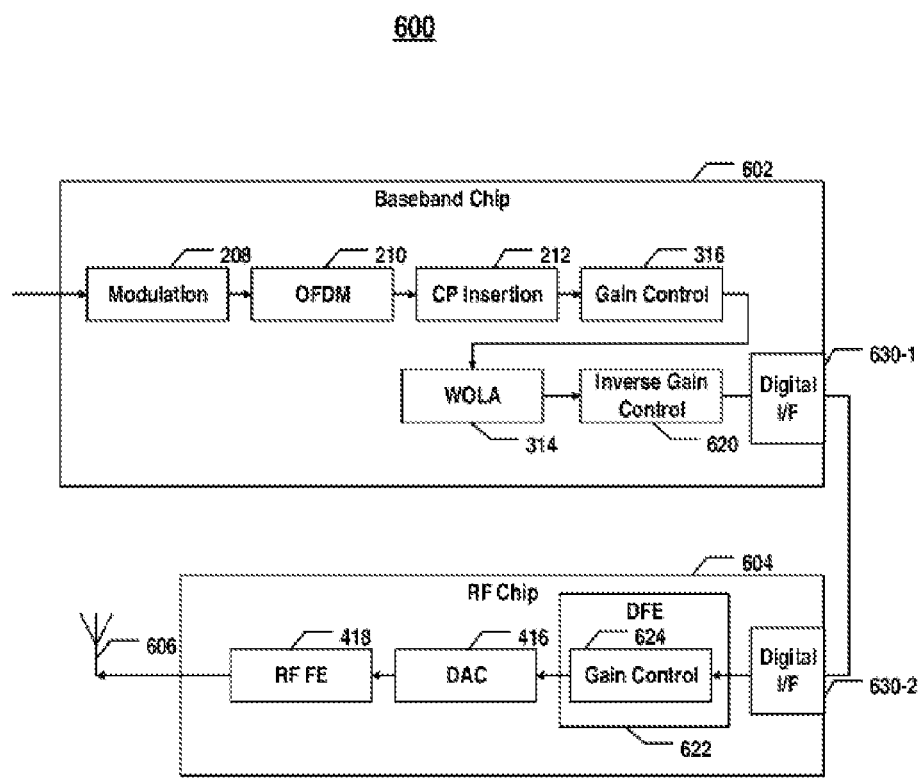
FIG. 6 illustrates a block diagram of an exemplary apparatus including a baseband chip implementing a digital gain, WOLA and an inverse digital gain on the OFDM symbols where WOLA is applied after the first digital gain is applied, and an RF chip implementing a digital gain on the OFDM symbols, according to some embodiments of the present disclosure.

For yet another example, FIG. 6 illustrates a block diagram of an exemplary apparatus 600 including a baseband chip 602 implementing digital gain control, WOLA, and inverse digital gain control on the OFDM symbols, where WOLA is applied after the first digital gain control is applied, and an RF chip 604 implementing digital gain control on the OFDM symbols, according to some embodiments of the present disclosure. Compared to apparatus 300, as described below in detail, by transmitting the OFDM or CP-OFDM symbols without adjusted gains to RF chip 604 (e.g., by applying the inverse gain control to restore the gain of the OFDM or CP-OFDM symbols back to the original gain level) and implementing the digital gain adjustment again on the OFDM or CP-OFDM symbols using RF chip 604, the design of the digital interfaces (e.g., digital interfaces 630-1 and 630-2) in baseband chip 602 and RF chip 604 can be simplified, and the power consumption can be reduced. As shown in FIG. 6, apparatus 600 may include baseband chip 602, RF chip 604, and an antenna 606. In some embodiments, baseband chip 602 is implemented by processor 1102 and memory 1104, and RF chip 604 is implemented by processor 1102, memory 1104, and transceiver 1106, as described above with respect to FIG. 11. It is understood that besides the various modules of baseband chip 602 and RF chip 604 in the uplink shown in FIG. 6, any other suitable modules, such as modules in the downlink, may be included in baseband chip 602 and RF chip 604 as well.

Compared with baseband chip 302 in apparatus 300, baseband chip 602 may further include an inverse gain control module 620 for applying an inverse gain adjustment to the WOLA-OFDM symbols (e.g., after WOLA is applied by WOLA module 314) with the adjusted gain to restore the original gain level of the OFDM or CP-OFDM symbols (e.g., before gain adjustment is applied by gain control module 316). For example, gain control module 316 may adjust the gain of the OFDM symbols from t to a target level T by applying a function G(x) to each of the OFDM symbols. Inverse gain control module 620 may restore the gain level of the smoothed WOLA-OFDM symbols (e.g., after WOLA being applied by WOLA module 314) to their original level t (e.g., without the gain being adjusted by gain control module 316) by applying a function 1/G(x) to each of the OFDM or CP-OFDM symbols. For the ease of illustration, the details of the same structures in baseband chips 302 and 602 are not be repeated for ease of description.

Compared with RF chip 404, instead of including both WOLA module 414 and gain control module 416 in digital front-end 422, digital front-end 622 in RF chip 604 only includes gain control module 624. Gain control module 624 may be configured to receive a stream of restored OFDM symbols (with WOLA applied and with original gain level) along with the gain control signal indicating target gain levels for the stream of OFDM symbols (e.g., the same target gain level applied by gain control module 316 in baseband chip 602) from baseband chip 602 through a digital interface 630-2, and perform digital gain adjustment on the stream of the restored OFDM symbols to readjust the gain level of the restored OFDM to the target level base on the gain control signal. For example, gain control module 624 may be configured to adjust the gain (power or amplitude) of each restored OFDM symbol based on the gain control signal received from baseband chip 602. In some embodiments, the gain control signal may be generated by modulation module 208 and/or OFDM module 210 and may be received by gain control module 316 along with the stream of OFDM symbols. Additional elements may be included in digital front-end 622 to perform any other front-end functions on digital signals, such as filtering, up-conversion, or sample-rate conversion. By adjusting the digital gain of the restored OFDM symbols back to the target gain level (e.g., same as the target gain level applied by gain control module 316) after WOLA was applied, the smoothed edges, broken by applying the inverse gain adjustment (e.g., applied by inverse gain control module 620) may be restored. Thus, the continuity between adjacent WOLA-OFDM symbols in the time domain (e.g., the smoothed edges between adjacent OFDM symbols) may be maintained.

Figure 12:
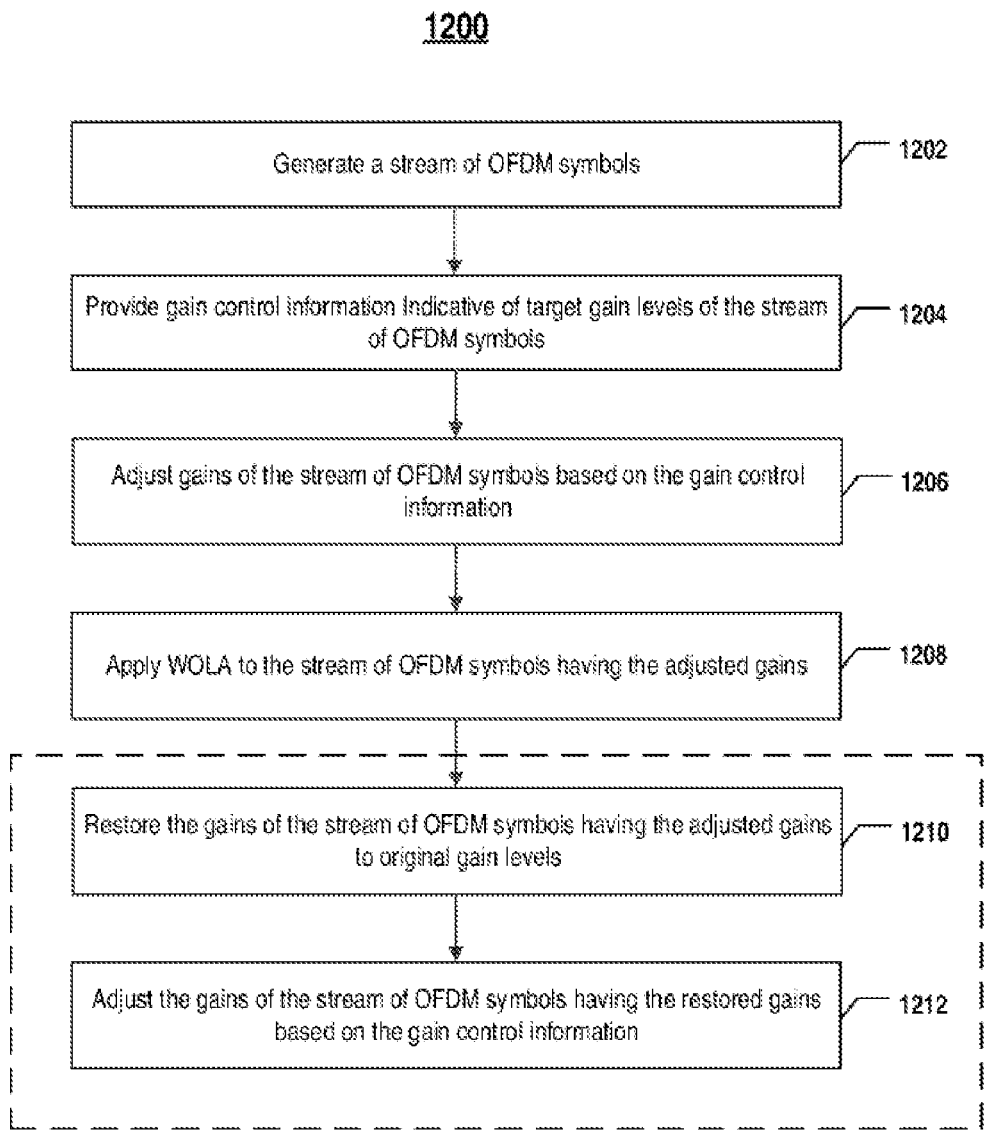
FIG. 12 illustrates a flow chart of an exemplary method for applying WOLA after a digital gain adjustment implementation, according to some embodiments of the present disclosure.

FIG. 12 illustrates a flow chart of an exemplary method 1200 for applying WOLA after a digital gain adjustment implementation, according to some embodiments of the present disclosure. Examples of the apparatus that can perform operations of method 1200 include, for example, apparatuses 300, 400, 500, or 600 depicted in FIG. 3, 4, 5, or 6 respectively, or any other suitable apparatus disclosed herein. It is understood that the operations shown in method 1200 are not exhaustive and that other operations can be performed as well before, after, or between any of the illustrated operations. Further, some of the operations may be performed simultaneously, or in a different order than shown in FIG. 12.

Referring to FIG. 12, method 1200 starts at operation 1202, in which a stream of symbols are generated by a baseband chip. The stream of symbols generated by the baseband chip may be free of WOLA and adjusted gains. In some embodiments, each symbol is an OFDM symbol. As shown in FIG. 3, 4, 5, or 6, baseband chips 302, 402, 502, or 602 may generate the stream of OFDM symbols without applying WOLA and digital gain adjustment.

Method 1200 proceeds to operation 1204, as illustrated in FIG. 12, in which gain control information indicative of target gain levels for the stream of OFDM symbol may be provided by the baseband chip. In some embodiments, where the gain adjustment is applied by the baseband chip, such as in apparatuses 300, 500, and 600 as illustrated in FIGS. 3, 5, and 6, respectively, the gain control signal may be generated internally within the gain control module. In some other embodiments, where the digital gain adjustment is applied on the RF chip such as in apparatuses 400 and 600 (e.g., having a second gain control module, such as gain control module 624 on the RF chip), as illustrated in FIGS. 4 and 6, the gain control signal is transmitted to the RF chip for facilitating the gain adjustment of each of the OFDM symbols.

Method 1200 proceeds to operation 1206, as illustrated in FIG. 12, in which the gain of the stream of symbols are adjusted based on the gain control information. As described above, in some embodiments, the gain adjustment applied by the gain control module may be applied on the baseband chip, such as in apparatuses 300, 500, and 600 based on the gain control signal generated internally as illustrated in FIGS. 3, 5, and 6, respectively. In some other embodiments, the gain adjustment applied by the gain control module may be applied on the RF chip such as in apparatuses 400 and 600 (e.g., gain control module 624) based on the gain control signal received from the baseband chip, as illustrated in FIGS. 4 and 6.

Method 1200 proceeds to operation 1208, as illustrated in FIG. 12, in which WOLA is applied to the stream of symbols having the adjusted gains. As described above, in some embodiments, WOLA applied by the WOLA module may be applied on the baseband chip, such as in apparatuses 300 and 600 as illustrated in FIGS. 3 and 6, respectively. WOLA may be applied by storing each OFDM symbol in entirety in a buffer in the baseband chip and copying the portion of each OFDM symbol based on memory addressing in the buffer. In some other embodiments, WOLA applied by the WOLA module may be applied on the RF chip, such as in apparatuses 400 and 500 based on symbol boundary information and the additional information associated with WOLA implementation received from the baseband chip, as illustrated in FIGS. 4 and 5, in a streamlined manner.

In some embodiments, method 1200 may optionally include operation 1210 in which the gains of the stream of OFDM symbols having the adjusted gains is restored to original gain levels by applying an inverse gain to the stream of OFDM symbols after applying WOLA to the stream of OFDM symbols with the adjusted gain on the baseband chip, and operation 1212 in which the gains of the stream of OFDM symbols having the restored gain is adjusted to the target gain level again based on the gain control information received from the baseband chip. For example, as illustrated in FIG. 6, inverse gain control module 620 of baseband chip 602 may apply the inverse gain adjustment to restore the gain of WOLA-OFDM symbols (e.g., OFDM symbols with smoothed edges) to the original level (e.g., before the gain is adjusted to the target level), and gain control module 624 of RF chip 604 may apply the gain adjustment to the stream of OFDM symbols with the restored gain to readjust the gain of the stream of OFDM symbols with the restored gain to the target level based on the gain control signal, as illustrated in FIG. 6.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 1100 in FIG. 11. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, an apparatus for wireless communication includes a baseband chip and an RF chip including a digital front-end. The baseband chip includes an OFDM module configured to generate a stream of OFDM symbols and a gain control module configured to adjust gains of the stream of OFDM symbols. The baseband chip or the RF chip includes a WOLA module configured to apply WOLA to the stream of OFDM symbols having the adjusted gains.

In some embodiments, the baseband chip further includes a buffer, and the WOLA module. To apply WOLA to the stream of OFDM symbols having the adjusted gains, the WOLA module of the baseband chip is configured to store each OFDM symbol of the stream of OFDM symbols in entirety in the buffer and copy a portion of each OFDM symbol based on memory addressing in the buffer.

In some embodiments, the baseband chip includes a digital interface configured to transmit, to the RF chip, the stream of OFDM symbols having the adjusted gains, and symbol boundary information indicative of boundaries of the stream of OFDM symbols.

In some embodiments, the RF chip further includes an RF front-end end, a digital interface configured to receive, from the baseband chip, the stream of OFDM symbols having the adjusted gains, and the symbol boundary information, and a digital front-end including the WOLA module, the WOLA module being configured to apply WOLA to the stream of OFDM symbols having the adjusted gains in a streamlined manner based on the symbol boundary information.

In some embodiments, the digital front-end of the RF chip further includes a symbol boundary signal generator configured to periodically generate symbol boundary signals each indicative of a beginning of a respective cyclic prefix of each OFDM symbol based on the symbol boundary information and a set of registers configured to store a length of the cyclic prefix and a length of a cyclic suffix.

In some embodiments, to apply WOLA to the stream of OFDM symbols having the adjusted gains, the WOLA module is further configured to copy a portion of each OFDM symbol identified based on a respective symbol boundary signal and the symbol boundary information and append the copied portion to an end of the respective OFDM symbol with a ramping-down window to form a weighed cyclic suffix of the respective OFDM symbol.

In some embodiments, the digital front-end of the RF chip further includes a buffer configured to store the copied portion of the respective OFDM symbol.

In some embodiments, to copy the portion of each OFDM symbol, the WOLA module is configured to store the portion of the respective OFDM symbol into the buffer as the respective OFDM symbol streams through the digital front-end and retrieve the copied portion of the respective OFDM symbol from the buffer in response to the end of the respective OFDM symbol reaching the digital front-end.

According to another aspect of the present disclosure, an apparatus for wireless communication includes a baseband chip and an RF chip including a digital front-end. The baseband chip includes an OFDM module configured to generate a stream of OFDM symbols and a digital interface configured to transmit the stream of OFDM symbols, gain control information indicative of target gain levels of the stream of OFDM symbols, and symbol boundary information indicative of boundaries of the stream of OFDM symbols. The RF chip includes a digital interface configured to receive, from the baseband chip, the stream of OFDM symbols, the gain control information, and the symbol boundary information, a gain control module configured to adjust gains of the stream of OFDM symbols based on the gain control information, and a WOLA module configured to apply WOLA to the stream of OFDM symbols having the adjusted gains in a streamlined manner based on the symbol boundary information.

In some embodiments, the digital front-end of the RF chip further includes a symbol boundary signal generator configured to periodically generate symbol boundary signals each indicative of a beginning of a respective cyclic prefix of each OFDM symbol based on the symbol boundary information and a set of registers configured to store a length of the cyclic prefix and a length of a cyclic suffix.

In some embodiments, to apply WOLA to the stream of OFDM symbols having the adjusted gains, the WOLA module is further configured to copy a portion of each OFDM symbol identified based on a respective symbol boundary signal and the symbol boundary information and append the copied portion to an end of the respective OFDM symbol with a ramping-down window to form a weighed cyclic suffix of the respective OFDM symbol.

In some embodiments, the RF chip further includes a buffer configured to store the copied portion of the respective OFDM symbol.

In some embodiments, to copy the portion of each OFDM symbol, the WOLA module is configured to store the portion of the respective OFDM symbol into the buffer as the respective OFDM symbol streams through the digital front-end and retrieve the copied portion of the respective OFDM symbol from the buffer in response to the end of the respective OFDM symbol reaching the digital front-end.

According to another aspect of the present disclosure, an apparatus for wireless communication includes a baseband chip and an RF chip including a digital front-end. The baseband chip includes an OFDM module configured to generate a stream of OFDM symbols, a gain control module configured to adjust gains of the stream of OFDM symbols, a WOLA module configured to apply WOLA to the stream of OFDM symbols having the adjusted gains, an inverse gain control module configured to restore the gains of the stream of OFDM symbols having the adjusted gains to original gain levels, and a digital interface configured to transmit the stream of OFDM symbols having the restored gains, and gain control information indicative of target gain levels of the stream of OFDM symbols. The RF chip includes a digital interface configured to receive, from the baseband chip, the stream of OFDM symbols having the restored gains, and the gain control information and a digital front-end configured to adjust the gains of the stream of OFDM symbols having the restored gains based on the gain control information.

In some embodiments, the baseband chip further includes a buffer. In soem embodiments, to apply WOLA to the stream of OFDM symbols having the adjusted gains, the WOLA module is configured to store each OFDM symbol of the stream of OFDM symbols in entirety in the buffer and copy a portion of each OFDM symbol based on memory addressing in the buffer.

In some embodiments, to restore the gains of the stream of OFDM symbols, the inverse gain control module of the baseband chip is configured to apply an inverse gain to the stream of OFDM symbols.

In some embodiments, to adjust the gains of the stream of OFDM symbols, the gain control module of the baseband chip is configured to adjust the gains of the stream of OFDM symbols to the target gain levels and to adjust the gains of the stream of OFDM symbols, the digital front-end of the RF chip is configured to adjust the gains of the stream of OFDM symbols to the target gain levels.

According to still another aspect of the present disclosure, a method implemented for wireless communication is disclosed. A stream of OFDM symbols is generated. Gains of the stream of OFDM symbols are adjusted. After adjusting the gains of the stream of OFDM symbols, (WOLA is applied to the stream of OFDM symbols having the adjusted gains.

In some embodiments, symbol boundary information indicative of boundaries of the stream of OFDM symbols is provided by a baseband chip. WOLA is applied to the stream of OFDM symbols having the adjusted gains by an RF chip in a streamlined manner based on the symbol boundary information.

In some embodiments, to apply WOLA to the stream of OFDM symbols having the adjusted gains, each OFDM symbol is stored in entirety in a buffer by a baseband chip, and a portion of each OFDM symbol is copied based on memory addressing in the buffer by the baseband chip.

In some embodiments, gain control signal indicating target gain levels of the stream of OFDM symbols is provided by a baseband chip.

In some embodiments, the gains of the stream of OFDM symbols based on the gain control information is adjusted by an (RF chip.

In some embodiments, after applying WOLA, the gains of the stream of OFDM symbols having the adjusted gains is restored to original gain levels, and after restoring the gains of the stream of OFDM symbols, the gains of the stream of OFDM symbols having the restored gains are adjusted based on the gain control information by an RF chip.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for wireless communication, comprising: a baseband chip; and a radio frequency (RF) chip,
wherein the baseband chip comprises:
an orthogonal frequency-division multiplexing (OFDM) module configured to generate a stream of OFDM symbols; and
a gain control module configured to adjust gains of the stream of OFDM symbols; and
wherein the baseband chip or the RF chip comprises a weighted overlap-and-add (WOLA) module configured to apply WOLA to the stream of OFDM symbols having the adjusted gains,
wherein the baseband chip further comprises a buffer, and the WOLA module; and
to apply WOLA to the stream of OFDM symbols having the adjusted gains, the WOLA module of the baseband chip is configured to:
store each OFDM symbol of the stream of OFDM symbols in entirety in the buffer; and
copy a portion of each OFDM symbol based on memory addressing in the buffer.

2. The apparatus of claim 1, wherein the baseband chip comprises a digital interface configured to transmit, to the RF chip, the stream of OFDM symbols having the adjusted gains, and symbol boundary information indicative of boundaries of the stream of OFDM symbols.

3. The apparatus of claim 2, wherein the RF chip comprises:
an RF front-end end;
a digital interface configured to receive, from the baseband chip, the stream of OFDM symbols having the adjusted gains, and the symbol boundary information; and
a digital front-end comprising the WOLA module, the WOLA module being configured to
apply WOLA to the stream of OFDM symbols having the adjusted gains in a streamlined manner based on the symbol boundary information.

4. The apparatus of claim 3, wherein the digital front-end of the RF chip further comprises:
a symbol boundary signal generator configured to periodically generate symbol boundary signals each indicative of a beginning of a respective cyclic prefix of each OFDM symbol based on the symbol boundary information; and
a set of registers configured to store a length of the cyclic prefix and a length of a cyclic suffix.

5. The apparatus of claim 4, wherein to apply WOLA to the stream of OFDM symbols having the adjusted gains, the WOLA module of the digital front-end of the RF chip is further configured to:
copy a portion of each OFDM symbol identified based on the respective symbol boundary signal, the length of the cyclic prefix, and the length of the cyclic suffix; and
append the copied portion to an end of the respective OFDM symbol with a ramping-down window to form a weighed cyclic suffix of the respective OFDM symbol.

6. The apparatus of claim 5, wherein the digital front-end of the RF chip further comprises a buffer configured to store the copied portion of the respective OFDM symbol.

7. The apparatus of claim 6, wherein to copy the portion of each OFDM symbol, the WOLA module of the digital front-end of the RF chip is configured to:
store the portion of the respective OFDM symbol into the buffer of the digital front-end of the RF chip as the respective OFDM symbol streams through the digital front-end; and
retrieve the copied portion of the respective OFDM symbol from the buffer of the digital front-end of the RF chip in response to the end of the respective OFDM symbol reaching the digital front-end.

8. The apparatus of claim 1, wherein the baseband chip further comprises an inverse gain control module configured to restore the gains of the stream of OFDM symbols having the adjusted gains to original gain levels, and
the RF chip comprises:
a digital interface configured to receive, from the baseband chip, the stream of OFDM symbols having the restored gains, and gain control information; and
a digital front-end configured to adjust the gains of the stream of OFDM symbols having the restored gains based on the gain control information.

9. The apparatus of claim 8, wherein to restore the gains of the stream of OFDM symbols, the inverse gain control module of the baseband chip is configured to apply an inverse gain to the stream of OFDM symbols; or,
to adjust the gains of the stream of OFDM symbols, the gain control module of the baseband chip is configured to adjust the gains of the stream of OFDM symbols to target gain levels, and the digital front-end of the RF chip is configured to adjust the gains of the stream of OFDM symbols to the target gain levels.

10. An apparatus for wireless communication, comprising:
a baseband chip comprising:
an orthogonal frequency-division multiplexing (OFDM) module configured to generate a stream of OFDM symbols; and
a digital interface configured to transmit the stream of OFDM symbols, gain control information indicative of target gain levels of the stream of OFDM symbols, and symbol boundary information indicative of boundaries of the stream of OFDM symbols; and
a radio frequency (RF) chip comprising a digital front-end comprising:
a digital interface configured to receive, from the baseband chip, the stream of OFDM symbols, the gain control information, and the symbol boundary information:
a gain control module configured to adjust gains of the stream of OFDM symbols based on the gain control information; and a weighted overlap-and-add (WOLA) module configured to apply WOLA to the stream of OFDM symbols having the adjusted gains in a streamlined manner based on the symbol boundary information,
wherein the baseband chip further comprises a buffer, and the WOLA module; and
to apply WOLA to the stream of OFDM symbols having the adjusted gains, the WOLA module of the baseband chip is configured to:
store each OFDM symbol of the stream of OFDM symbols in entirety in the buffer; and
copy a portion of each OFDM symbol based on memory addressing in the buffer.

11. The apparatus of claim 10, wherein the digital front-end of the RF chip further comprises:
a symbol boundary signal generator configured to periodically generate symbol boundary signals each indicative of a beginning of a respective cyclic prefix of each OFDM symbol based on the symbol boundary information; and
a set of registers configured to store a length of the cyclic prefix and a length of a cyclic suffix.

12. The apparatus of claim 11, wherein to apply WOLA to the stream of OFDM symbols having the adjusted gains, the WOLA module of the digital front-end of the RF chip is further configured to:
copy a portion of each OFDM symbol identified based on the respective symbol boundary signal, the length of the cyclic prefix, and the length of the cyclic suffix; and
append the copied portion to an end of the respective OFDM symbol with a ramping-down window to form a weighed cyclic suffix of the respective OFDM symbol.

13. The apparatus of claim 12, wherein the digital front-end of the RF chip further comprises a buffer configured to store the copied portion of the respective OFDM symbol.

14. The apparatus of claim 13, wherein, to copy the portion of each OFDM symbol, the WOLA module of the digital front-end of the RF chip is configured to:
store the portion of the respective OFDM symbol into the buffer of the digital front-end of the RF chip as the respective OFDM symbol streams through the digital front-end; and
retrieve the copied portion of the respective OFDM symbol from the buffer of the digital front-end of the RF chip in response to the end of the respective OFDM symbol reaching the digital front-end.

15. A method for wireless communication, comprising:
generating a stream of orthogonal frequency-division multiplexing (OFDM) symbols;
adjusting gains of the stream of OFDM symbols; and
after adjusting the gains of the stream of OFDM symbols, applying weighted overlap-and-add (WOLA) to the stream of OFDM symbols having the adjusted gains,
wherein applying WOLA comprises:
storing, by a baseband chip, each OFDM symbol of the stream of OFDM symbols in entirety in a buffer in the baseband chip; and
copying, by the baseband chip, a portion of each OFDM symbol based on memory addressing in the buffer.

16. The method of claim 15, further comprising providing, by the baseband chip, symbol boundary information indicative of boundaries of the stream of OFDM symbols,
wherein applying WOLA further comprises applying, by a radio frequency (RF) chip, WOLA to the stream of OFDM symbols having the adjusted gains in a streamlined manner based on the symbol boundary information.

17. The method of claim 15, further comprising providing, by the baseband chip, gain control information indicative of target gain levels of the stream of OFDM symbols.

18. The method of claim 17, wherein adjusting the gains of the stream of OFDM symbols comprises adjusting, by an RF chip, the gains of the stream of OFDM symbols based on the gain control information.

\* \* \* \* \*